(12) United States Patent
Kitoh

(10) Patent No.: US 7,004,538 B2
(45) Date of Patent: Feb. 28, 2006

(54) CONTROL APPARATUS OF DRIVE MOTOR FOR SUNROOF DEVICE, SUNROOF DEVICE, AND METHOD FOR CONTROLLING DRIVE MOTOR FOR SUNROOF DEVICE

(75) Inventor: Kazuto Kitoh, Toyohashi (JP)

(73) Assignee: Asmo Co., Ltd., Kosai (JP)

( * ) Notice: Subject to any disclaimer, the term of this patent is extended or adjusted under 35 U.S.C. 154(b) by 0 days.

(21) Appl. No.: 10/978,725

(22) Filed: Nov. 1, 2004

(65) Prior Publication Data

US 2005/0099037 A1 May 12, 2005

(30) Foreign Application Priority Data

Nov. 7, 2003 (JP) .............................. 2003-379086

(51) Int. Cl.
*B60J 7/057* (2006.01)

(52) U.S. Cl. .................. 296/216.02; 296/221; 296/223

(58) Field of Classification Search ............................... 296/216.02–216.03, 221, 223
See application file for complete search history.

(56) References Cited

U.S. PATENT DOCUMENTS

| 4,502,726 A | * | 3/1985 | Adams ........................ 296/221 |
| 6,283,543 B1 | * | 9/2001 | Hahn et al. .................. 296/223 |
| 6,315,355 B1 | * | 11/2001 | Lamm et al. ................ 296/213 |

OTHER PUBLICATIONS

JP Laid-Open Utility Model Publ. No. 5-41922, Jun. 8, 1993, Matsuda Kabushiki Kaisha, et al.
JP National Phase Laid-Open Patent Publication No. 2002-503303 (WO 99/53589), Jan. 29, 2002, Robert Bosch GMBH.

* cited by examiner

*Primary Examiner*—Dennis H. Pedder
(74) *Attorney, Agent, or Firm*—Colin P. Cahoon; Carstens & Choon, LLP

(57) ABSTRACT

An apparatus for controlling a motor driving an opening and closing body of a sunroof device includes a drive portion and a control portion. The drive portion supplies current to the motor to rotate the motor. The drive portion has a changing device for changing the torque of the motor. The control portion controls the changing device such that the torque of the motor is increased as the traveling speed of a vehicle is increased during a closing operation of the opening and closing body. Therefore, closure force and catching force of the opening and closing body during a closing operation is optimized.

16 Claims, 4 Drawing Sheets

CONTROL APPARATUS OF DRIVE MOTOR FOR SUNROOF DEVICE, SUNROOF DEVICE, AND METHOD FOR CONTROLLING DRIVE MOTOR FOR SUNROOF DEVICE

BACKGROUND OF THE INVENTION

The present invention relates to a control apparatus of a drive motor for a sunroof device, which controls the drive motor to selectively open and close an opening and closing body of, for example, a roof glass of an automobile, the sunroof device, and a method for controlling the drive motor for the sunroof device.

In the prior art, a control apparatus of a drive motor for selectively opening and closing an opening and closing body of, for example, a roof glass of an automobile has been disclosed in Japanese Laid-Open Utility Model Publication No. 5-41922. The opening and closing control apparatus of the opening and closing body disclosed in the above publication includes a control circuit provided with an opening relay, which supplies drive current to rotate a motor in a direction to open the opening and closing body, and a closing relay, which supplies drive current to rotate the motor in a direction to close the opening and closing body. A resistor is located between the closing relay and a battery, which supplies drive current to drive the motor.

That is, the resistor located between the closing relay and the battery reduces the drive current supplied to the motor when closing the opening and closing body as compared to the drive current supplied to the motor when opening the opening and closing body. Therefore, the operating speed of the opening and closing body during a closing operation is less than the operating speed of the opening and closing body during an opening operation. This suppresses catching force when a foreign object gets caught by the opening and closing body. The catching force corresponds to a load applied to a foreign object when the foreign object is caught between an opening portion formed in a roof panel of a vehicle and the opening and closing body located corresponding to the opening portion.

The opening and closing control apparatus for an opening and closing body disclosed in the above publication slides the opening and closing body rearward of the vehicle.

In a sunroof device in which an opening and closing body tilts, when the opening and closing body is tilted up while the automobile is traveling, pulling-up force due to a negative-pressure is applied to the upper portion of the opening and closing body and a swirl is generated at the rear end of the opening and closing body. The opening and closing body thus receives upward force as if the opening and closing body is pulled or pushed upward. The upward force increases as the traveling speed of the vehicle increases.

Therefore, in a case where the closing speed of the opening and closing body is set to a constant speed (constant torque) as in the apparatus of the above publication, if the operating speed (rotational speed of the motor) is set based on the condition when the vehicle is traveling at a high speed, the catching force may become excessive when the vehicle is traveling at a low speed. Contrarily, if the operating speed (rotational speed of the motor) is set based on the condition when the vehicle is traveling at a low speed, closure force when the vehicle is traveling at a high speed may become insufficient.

SUMMARY OF THE INVENTION

Accordingly, it is an objective of the present invention to provide a control apparatus of a drive motor for a sunroof device that optimize closure force and catching force of an opening and closing body during a closing operation, the sunroof device, and a method for controlling the drive motor for the sunroof device.

To achieve the above-mentioned objective, the present invention provides an apparatus for controlling a motor. The motor drives an opening and closing body of a sunroof device. The opening and closing body is driven by the motor such that the opening and closing body is tilted to selectively open and close an opening portion formed in a roof panel of a vehicle. The apparatus includes a drive portion and a control portion. The drive portion supplies current to the motor to rotate the motor. The drive portion has a changing device for changing the torque of the motor. The control portion controls the drive portion. The control portion controls the changing device such that the torque of the motor is increased as the traveling speed of the vehicle is increased during a closing operation of the opening and closing body.

Another aspect of the present invention provides a sunroof device including the opening and closing body, the motor, the drive portion having the changing device, and the control portion.

Another aspect of the present invention provides a method for controlling a motor. The method includes driving the opening and closing body by the motor such that the opening and closing body is tilted to selectively open and close an opening portion formed in the roof panel of the vehicle; and controlling the motor such that the torque of the motor is increased as the traveling speed of the vehicle is increased during closing operation of the opening and closing body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

Figure 3:
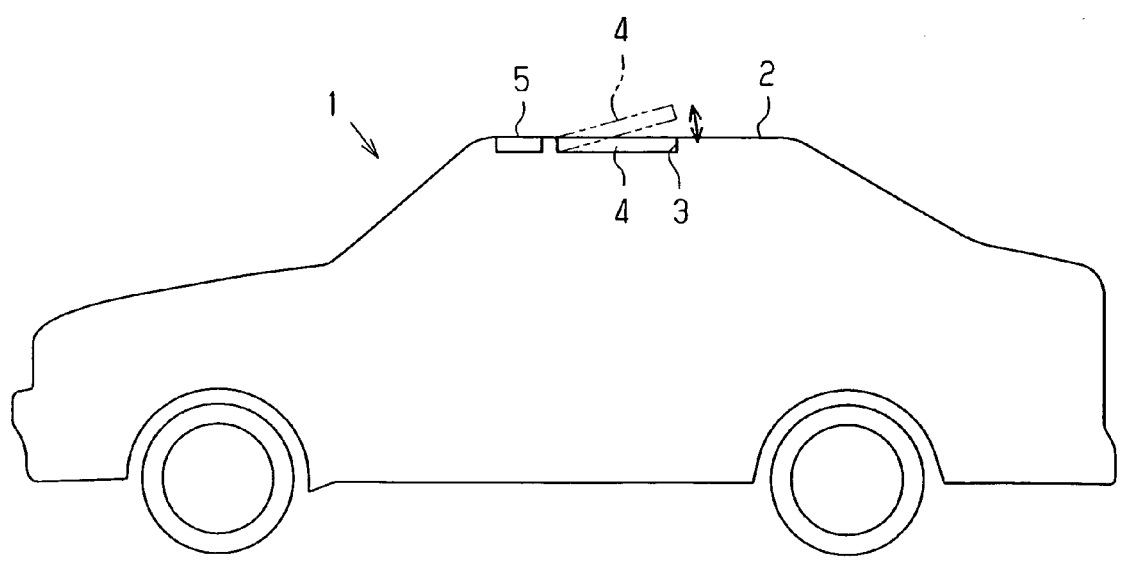
FIG. 3 is a diagram illustrating a tilt opening and closing operation of the roof glass controlled by the apparatus of FIG. 1.

As shown in FIG. 3, a vehicle 1 has a roof panel 2 in which a rectangular roof opening portion 3 is formed. The vehicle 1 has a roof glass 4. The roof glass 4 functions as an opening and closing body for the roof opening portion 3. The roof glass 4 moves vertically around the axis extending in the width direction of the vehicle at the front end of the roof glass 4 (tilt opening and closing operation) and slides in the front and rear direction of the vehicle (slide opening and closing operation). The roof glass 4 is selectively opened and closed by a sunroof drive mechanism (not shown), which is driven by a drive motor 5. The motor 5 is accommodated between the roof panel 2 and a molded ceiling panel in the passenger compartment, which is not shown, and between the upper end of a front glass and the front end of the roof opening portion 3.

Figure 1:
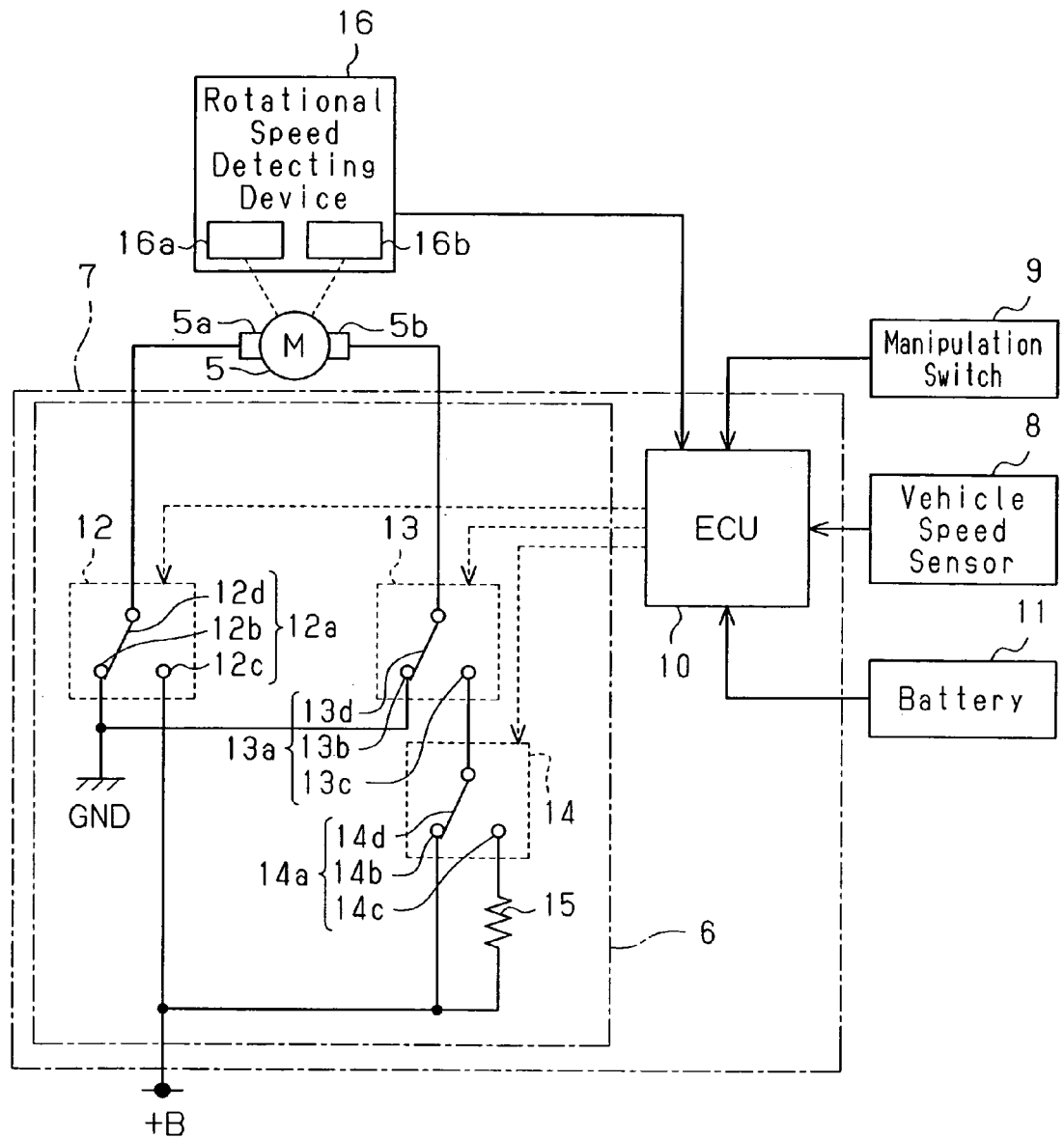
FIG. 1 is a block diagram illustrating a control apparatus of a roof glass according to one embodiment of the present invention.

FIG. 1 shows an electrical configuration of a control apparatus 7, which controls the operation of the roof glass 4. The control apparatus 7 includes the motor 5, a drive portion 6, which controls the motor 5, and an electronic control unit (ECU) 10. The ECU 10 functions as a control portion for controlling the drive portion 6 based on a speed detection signal output from a vehicle speed sensor 8 and manipulation of a manipulation switch 9. The ECU 10 serves as catching control means and threshold value changing means. The ECU 10 is supplied with drive current from a battery 11.

The drive portion 6 is supplied with current of drive power source +B from the battery 11. The drive portion 6 includes two drive relays 12, 13, which are controlled by the ECU 10, and a switching relay 14, which is also controlled by the ECU 10 and forms a torque changing device (torque switching means). A switch 12a of the drive relay 12 includes two contacts 12b, 12c and a movable terminal 12d, which is switched between the contacts 12b, 12c by the control of the ECU 10. The contact 12b is connected to ground GND and the contact 12c is connected to the battery 11 and receives current of the drive power source +B. The movable terminal 12d is connected to a first power source terminal 5a of the motor 5.

In the same manner as the drive relay 12, a switch 13a of the drive relay 13 includes two contacts 13b, 13c and a movable terminal 13d, which is switched between the contacts 13b, 13c by the control of the ECU 10. The contact 13b is connected to the ground GND and the contact 13c is connected to a movable terminal 14d of the switching relay 14, which will be described later. The movable terminal 13d is connected to a second power source terminal 5b of the motor 5.

A switch 14a of the switching relay 14 includes two contacts 14b, 14c and the movable terminal 14d, which is switched between the contacts 14b, 14c by the control of the ECU 10. The contact 14b is connected to the battery 11 and receives current of the drive power source +B. The contact 14c is connected to the battery 11 via a resistor 15, which forms part of the torque changing device, and receives current of the drive power source +B. That is, the torque changing device includes a switching circuit, which switches between a current path that includes the resistor 15 and a current path that does not include the resistor 15. The switching relay 14 and the resistor 15 form the switching circuit.

The manipulation switch 9 sends an opening operation ON signal and an opening operation OFF signal related to the tilt opening operation of the roof glass 4 to the ECU 10 and sends a closing operation ON signal and a closing operation OFF signal related to the tilt closing operation of the roof glass 4 to the ECU 10.

The ECU 10 receives an opening operation OFF signal and a closing operation OFF signal from the manipulation switch 9 when the manipulation switch 9 is not manipulated. The ECU 10 thus controls the drive portion 6 to maintain the motor 5 to be stopped. That is, the movable terminals 12d, 13d of the drive relays 12, 13 are connected to the contacts 12b, 13b, respectively. In other words, the ECU 10 connects the power source terminals 5a, 5b of the motor 5 to the ground GND.

When the manipulation switch 9 is manipulated and the opening operation ON signal is sent from the manipulation switch 9, the ECU 10 controls the drive portion 6 such that the roof glass 4 is tilted up. That is, the movable terminal 12d of the drive relay 12 is connected to the contact 12c to drive the motor 5. In other words, the ECU 10 supplies current of the drive power source +B to the first power source terminal 5a of the motor 5 and connect the second power source terminal 5b to the ground GND. When the manipulation of the manipulation switch 9 is stopped, an opening operation OFF signal is sent from the manipulation switch 9. The ECU 10 thus controls the drive portion 6 to stop the motor 5. That is, the movable terminal 12d of the drive relay 12 is connected to the contact 12b.

When the manipulation switch 9 is manipulated and a closing operation ON signal is sent from the manipulation switch 9, the ECU 10 controls the drive portion 6 to tilt down the roof glass 4. That is, the movable terminal 13d of the drive relay 13 is connected to the contact 13c to drive the motor 5. In other words, the ECU 10 connects the first power source terminal 5a of the motor 5 to the ground GND and supplies current of the drive power source +B to the second power source terminal 5b via the switching relay 14. When the manipulation of the manipulation switch 9 is stopped, a closing operation OFF signal is sent from the manipulation switch 9. The ECU 10 thus controls the drive portion 6 to stop the motor 5. That is, the movable terminal 13d of the drive relay 13 is connected to the contact 13b.

The ECU 10 receives a vehicle speed detection signal that corresponds to the traveling speed of the vehicle 1 from the vehicle speed sensor 8 connected to the ECU 10. The ECU 10 determines whether the traveling speed of the vehicle 1 is in a low speed range $\alpha$ or in a high speed range $\beta$ based on the vehicle speed detection signal sent from the vehicle speed sensor 8 and controls the drive portion 6. In this embodiment, the low speed range $\alpha$ refers to the speed less than 2 [km/h] and the high speed range $\beta$ refers to the speed greater than or equal to 2 [km/h].

When it is determined that the traveling speed of the vehicle 1 is in the low speed range $\alpha$, the ECU 10 controls the switching relay 14 to connect the movable terminal 14d to the contact 14c. That is, in order to tilt down the roof glass 4 when the traveling speed of the vehicle 1 is in the low speed range $\alpha$, the ECU 10 supplies current of the drive power source +B to the second power source terminal 5b of the motor 5 via the resistor 15. The drive current supplied to the motor 5 is reduced by the resistance of the resistor 15.

When it is determined that the traveling speed of the vehicle 1 is in the high speed range $\beta$, the ECU 10 controls the switching relay 14 to connect the movable terminal 14d to the contact 14b. That is, in order to tilt down the roof glass 4 when the traveling speed of the vehicle 1 is in the high speed range $\beta$, the ECU 10 directly supplies current of the drive power source +B to the second power source terminal 5b of the motor 5 without via the resistor 15. Therefore, the drive current supplied to the motor 5 is increased as compared to a case where the traveling speed of the vehicle 1 is in the low speed range $\alpha$.

The motor 5 integrally includes a rotational speed detecting device 16 for detecting the rotational speed of the motor 5. The rotational speed detecting device 16 includes a pair of Hall element magnetic sensors 16a, 16b for detecting the rotational cycle (rotational speed) and the rotational direction of the motor 5. The Hall element magnetic sensors 16a, 16b form catching control means. More specifically, a sensor magnet (not shown), which is multi-polarized in the rotational direction, is attached to a rotational shaft (not shown) of the motor 5 to rotate integrally with the rotational shaft. The Hall element magnetic sensors 16a, 16b are located in the vicinity of the sensor magnet at a predetermined angle from each other in the rotational direction. That is, the rotational sensor of this embodiment uses a non-contact type rotational sensor that uses magnetism.

When the motor 5 rotates, each Hall element magnetic sensor 16a, 16b sends a pulsed output signal corresponding to the rotation of the motor 5 to the ECU 10. The output signal (pulse signal) sent from each Hall element magnetic sensor 16a, 16b has a phase difference (for example, ½ cycle) from each other. The rotational speed detecting device 16 forms the waveform of each output signal (pulse signal) and sends it to the ECU 10.

The ECU 10 detects the rotational cycle (rotational speed) of the motor 5 based on the cycle of the output signal (pulse signal) sent from the rotational speed detecting device 16 (each Hall element magnetic sensor 16a, 16b).

That is, when the manipulation switch 9 is manipulated and an opening operation ON signal is received, the ECU 10 increments a counter value by one at every cycle of the output signal (pulse signal) based on, for example, a rising edge. When the manipulation switch 9 is manipulated and a closing operation ON signal is received, the ECU 10 subtracts one from the counter value, which has been incremented by one at every one cycle of the output signal (pulse signal) during opening operation. The ECU 10 detects the opening and closing position of the roof glass 4, that is, the vertical position of the roof glass 4 during the tilt operation, in accordance with the counter value.

The ECU 10 detects the rotational direction of the motor 5 in accordance with the phase difference of each output signal (pulse signal) and detects the opening and closing direction (vertical direction) of the roof glass 4 based on detection of the rotational direction of the motor 5.

A predetermined threshold value (reference rotational speed) is set in the ECU 10 to determine whether a foreign object is caught between the rim of the roof opening portion 3 and the roof glass 4 in accordance with the detected rotational speed of the motor 5. That is, the ECU 10 uses the rotational speed of the motor 5 as a value indicating the driving state of the motor 5. The threshold value is a pulse width (rotational cycle of the motor) of the output signal (pulse signal) sent from the rotational speed detecting device 16 (Hall element magnetic sensors 16a, 16b) when the motor 5 is driven at a predetermined rotational speed. The predetermined rotational speed is the reference rotational speed for determining that a foreign object is caught between the rim of the roof opening portion 3 and the roof glass 4.

More specifically, the threshold value of the low speed range $\alpha$ is a pulse width X1 and the threshold value of the high speed range $\beta$ is a pulse width X2. In this embodiment, in a case where a tilt closing operation is performed on the roof glass 4 when the traveling speed of the vehicle 1 is in the high speed range $\beta$, the ECU 10 controls the drive current supplied to the motor 5 to be increased as compared to a case where the traveling speed of the vehicle 1 is in the low speed range $\alpha$. That is, in a case where a tilt closing operation is performed on the roof glass 4 when the traveling speed of the vehicle 1 is in the high speed range $\beta$, the ECU 10 controls the torque to be increased as compared to a case where the traveling speed of the vehicle 1 is in the low speed range $\alpha$. In other words, the ECU 10 changes the threshold value in accordance with the control state of the changing device.

Therefore, the pulse width X2, which is the threshold value in the high speed range $\beta$ is set to a shorter width than the pulse width X1, which is the threshold value in the low speed range $\alpha$. In view of the rotational speed of the motor 5, the rotational speed of the motor 5 when the output signal having the pulse width X2, which is the threshold value at the high speed range $\beta$, is sent from the rotational speed detecting device 16 is greater than the rotational speed of the motor 5 when the output signal having the pulse width X1, which is the threshold value at the low speed range $\alpha$, is sent from the rotational speed detecting device 16.

As described above, the ECU 10 sets the threshold value (pulse width X1, X2) for each of the low speed range $\alpha$ and the high speed range $\beta$. The ECU 10 changes the threshold value corresponding to the control of the switching relay 14 performed by the ECU 10 in accordance with the torque of the motor 5, which is changed in accordance with whether the traveling speed of the vehicle 1 is in the low speed range $\alpha$ or the high speed range $\beta$. This stabilizes the catching force in both the low speed range $\alpha$ and the high speed range $\beta$. That is, the ECU 10 changes the threshold value such that the catching force by the roof glass 4 becomes constant.

If the pulse width Y of the output signal (rotational cycle of the motor) sent from the rotational speed detecting device 16 becomes longer than a predetermined pulse width, which is a threshold value, while the roof glass 4 is in a tilt closing operation, the ECU 10 determines that the pulse width Y is extended, that is, the rotational speed of the motor is decreased because a foreign object is caught by the roof glass 4. At this time, the ECU 10 selects one of the pulse width X1, X2, which are the threshold values, in accordance with whether the traveling speed of the vehicle 1 is in the low speed range $\alpha$ or the high speed range $\beta$.

Based on the determination, the ECU 10 controls the drive relays 12, 13 such that the motor is driven in the reverse direction. The roof glass 4 is thus tilted up to the complete open position so that the foreign object caught by the roof glass 4 can be removed. The ECU 10, which has been subtracting the counter value, starts incrementing the counter value when the motor 5 is driven in the reverse direction.

The operation of the control apparatus 7 constituted as described above will now be described. The vertical movement of the roof glass 4 (tilting up and tilting down) will mainly be discussed below.

FIG. 1 shows a state of the control apparatus 7 when the vehicle 1 is stopped and the motor 5 is stopped. The movable terminals 12d, 13d of the drive relays 12, 13 are connected to the contacts 12b, 13b, respectively. Therefore, current of drive power source +B is not supplied to the motor 5, and the motor 5 is not driven.

In this state, when the manipulation switch 9 is manipulated to tilt up the roof glass 4, the ECU 10 receives an opening operation ON signal from the manipulation switch 9. The ECU 10 then controls the drive relay 12 to connect the movable terminal 12d to the contact 12c. Therefore, current of the drive power source +B is supplied to the motor 5 to drive the motor 5, and the roof glass 4 is tilted up via the sunroof drive mechanism. While the opening operation ON signal is sent to the ECU 10, current of the drive power source +B is supplied to the motor 5 and the motor 5 is kept driven.

When the manipulation of the manipulation switch 9 is stopped to stop the tilt opening operation of the roof glass 4, an opening operation OFF signal is sent to the ECU 10. The ECU 10 thus controls the drive relay 12 to connect the movable terminal 12d to the contact 12b. Then, the supply of current of the drive power source +B is stopped and the motor 5 is stopped. When the roof glass 4 is located at the complete open position, even if the manipulation switch 9 is manipulated and the ECU 10 receives the opening operation ON signal, the ECU 10 controls the drive relay 12 to connect the movable terminal 12d to the contact 12b so that the motor 5 is stopped.

In this state, when the manipulation switch 9 is manipulated to tilt down the roof glass 4, the ECU 10 receives a closing operation ON signal from the manipulation switch 9. The ECU 10 then controls the drive relay 13 to connect the movable terminal 13d to the contact 13c. Furthermore, the ECU 10 determines whether the traveling speed of the vehicle 1 is in the low speed range α (less than 2 [km/h]) or the high speed range β (greater than or equal to 2 [km/h]) based on the vehicle speed detection signal sent from the vehicle speed sensor 8.

If it is determined that the traveling speed of the vehicle 1 is in the low speed range α, the ECU 10 controls the switching relay 14 to connect the movable terminal 14d to the contact 14c. Then, the motor 5 is supplied with current of the drive power source +B via the resistor 15 in a direction opposite to the current supplied during the tilt opening operation. The motor 5 is thus driven to tilt down the roof glass 4 via the sunroof drive mechanism.

When it is determined that the traveling speed of the vehicle 1 is in the high speed range β, the ECU 10 controls the switching relay 14 to connect the movable terminal 14d to the contact 14b. Then, the motor 5 is directly supplied with current of the drive power source +B in a direction opposite to the current supplied during the tilt opening operation without passing through the resistor 15. The motor 5 is thus driven to tilt down the roof glass 4 via the sunroof drive mechanism.

That is, in the tilt closing operation of the roof glass 4, if the traveling speed of the vehicle 1 is in the low speed range α, current of the drive power source +B is supplied to the motor 5 via the resistor 15. Therefore, the amount of drive current supplied to the motor 5 is reduced as compared to the case where current of the drive power source +B is directly supplied to the motor 5 without via the resistor 15 as when the traveling speed of the vehicle 1 is in the high speed range β.

Figure 2:
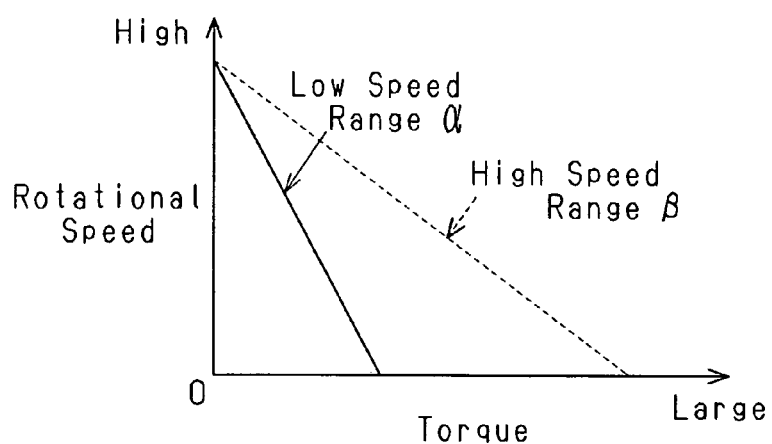
FIG. 2 is a characteristic diagram showing the relationship between the torque and the rotational speed of a drive motor incorporated in the apparatus of FIG. 1.

As a result, as shown in FIG. 2, on condition that the rotational speed of the motor 5 is maintained constant, the torque of the motor 5 is suppressed when the traveling speed of the vehicle 1 is in the low speed range α as compared to the case where the traveling speed of the vehicle 1 is in the high speed range β. In other words, the torque of the motor 5 is great when the traveling speed of the vehicle 1 is in the high speed range β as compared to the case where the traveling speed of the vehicle 1 is in the low speed range α.

As the traveling speed of the vehicle 1 increases, a pulling-up force due to a negative-pressure applied to the upper portion of the roof glass 4 and an upward force applied to the roof glass 4 by a swirl generated at the rear portion of the roof glass 4 are increased. Therefore, the torque of the motor 5 is relatively increased when the traveling speed of the vehicle 1 is in the high speed range β as compared to the case where the traveling speed of the vehicle 1 is in the low speed range α to increase the closure force of the roof glass 4 accordingly. Contrarily, when the traveling speed of the vehicle is in the low speed range α, the torque of the motor 5 is relatively decreased as compared to the case where the traveling speed of the vehicle 1 is in the high speed range β to suppress the catching force of the roof glass 4.

While the closing operation ON signal is sent to the ECU 10, current of the drive power source +B is supplied to the motor 5 and the motor 5 is kept driven in the above described manner. When the manipulation of the manipulation switch 9 is stopped to stop the tilt closing operation of the roof glass 4, a closing operation OFF signal is sent to the ECU 10. The ECU 10 thus controls the drive relay 13 to connect the movable terminal 13d to the contact 13b. Then, the supply of current of the drive power source +B is stopped and the motor 5 is stopped. When the roof glass 4 is located at the complete closure position, even if the manipulation switch 9 is manipulated and the ECU 10 receives the closing operation ON signal, the ECU 10 controls the drive relay 13 to connect the movable terminal 13d to the contact 13b so that the motor 5 is stopped.

Figure 4:
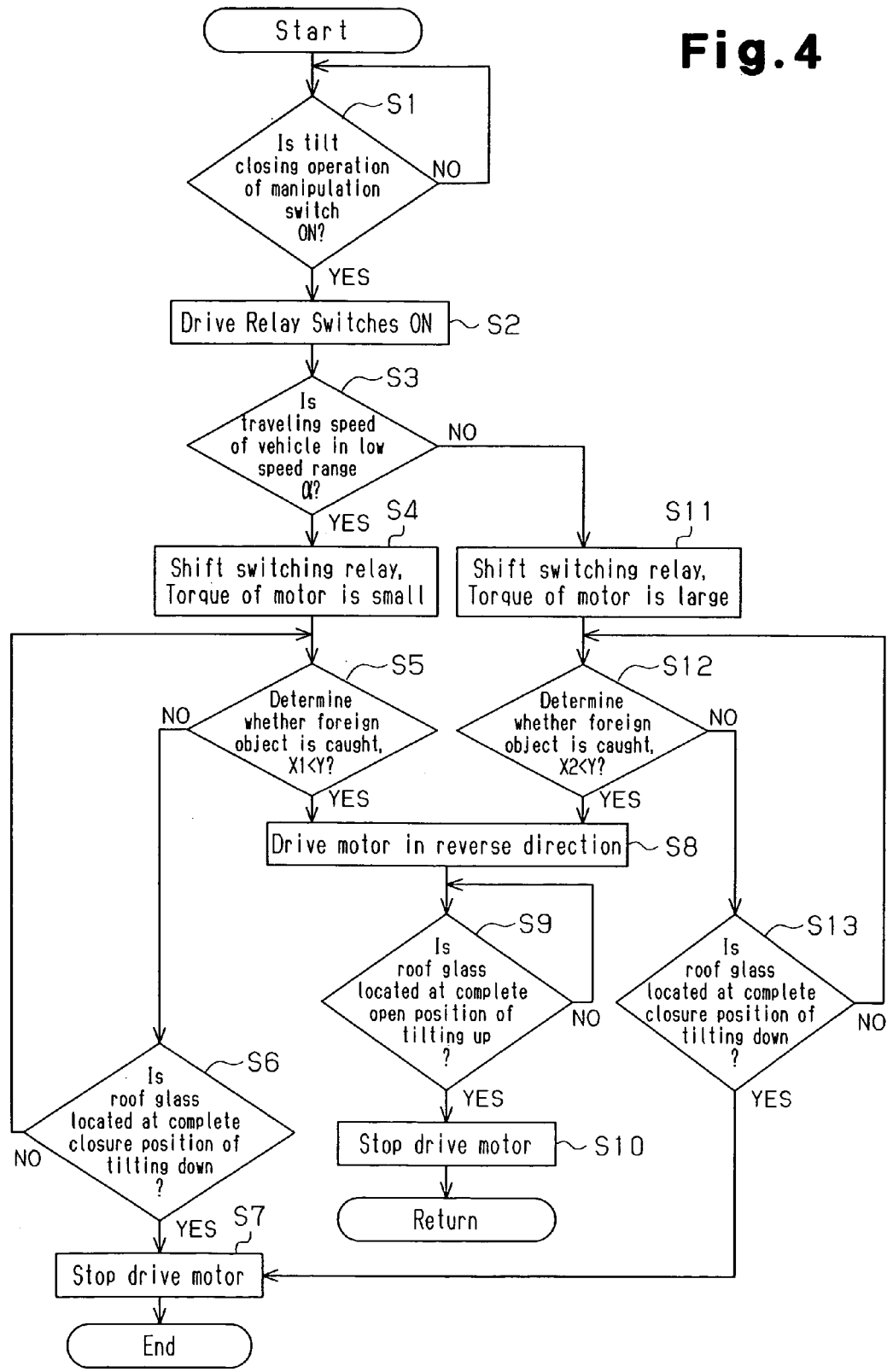
FIG. 4 is a flowchart showing the control performed by the apparatus of FIG. 1 during the tilt closing operation of the roof glass.

The process executed when the ECU 10, which controls the motor 5, tilts down the roof glass 4 will now be described with reference to the flowchart of FIG. 4.

At step S1, the ECU 10 determines whether a closing operation ON signal is sent from the manipulation switch 9. If it is determined that the closing operation ON signal is sent from the manipulation switch 9, the ECU 10 proceeds to step S2. At step S2, the ECU 10 controls the drive relay 12 to connect the movable terminal 12d to the contact 12b and controls the drive relay 13 to connect the movable terminal 13d to the contact 13c. Then, the ECU 10 proceeds to step S3.

At step S3, the ECU 10 determines whether the traveling speed of the vehicle 1 is in the low speed range α. If it is determined that the traveling speed of the vehicle 1 is in the low speed range α, the ECU 10 proceeds to step S4 and controls the switching relay 14 to connect the movable terminal 14d to the contact 14c. After that, the ECU 10 proceeds to step S5.

At step S5, the ECU 10 determines whether the pulse width Y of the input signal (pulse signal) sent from the rotational speed detecting device 16 is greater than the pulse width X1, which is the threshold value for the low speed range α. If it is determined that the pulse width Y is not greater than the pulse width X1, that is, the pulse width Y is less than or equal to the pulse width X1, the ECU 10 proceeds to step S6.

At step S6, the ECU 10 determines whether the roof glass 4 is located at the complete closure position of tilting down. If it is determined that the roof glass 4 is at the complete closure position of tilting down, the ECU 10 proceeds to step S7 and stops the motor 5.

If it is determined that the roof glass 4 is not located at the complete closure position at step S6, the ECU 10 returns to step S5.

At step S5, if it is determined that the pulse width Y of the input signal (pulse signal) sent from the rotational speed detecting device 16 is greater than the pulse width X1, which is the threshold value for the low speed range α, the ECU 10 determines that a foreign object is caught between the rim of the roof opening portion 3 and the roof glass 4 and proceeds to step S8. At step S8, the ECU 10 drives the motor 5 in the reverse direction to release the caught foreign object, and proceeds to step S9.

At step S9, the ECU 10 determines whether the roof glass 4 is tilted up and located at the complete open position so that the caught foreign object can be released. If it is determined that the roof glass 4 is at the complete open position, the ECU 10 proceeds to step S10 and stops the motor 5.

At step S3, if it is determined that the traveling speed of the vehicle 1 is not in the low speed range α, that is, the traveling speed of the vehicle 1 is in the high speed range β, the ECU 10 proceeds to step S11 and controls the switching relay 14 to connect the movable terminal 14d to the contact 14b. Then, the ECU 10 proceeds to S12.

At step S12, the ECU 10 determines whether the pulse width Y of the input signal (pulse signal) sent from the rotational speed detecting device 16 is greater than the pulse width X2, which is the threshold value for the high speed range β. If it is determined that the pulse width Y is not greater than the pulse width X2, that is, the pulse width Y is less than or equal to the pulse width X2, the ECU 10 proceeds to step S13.

At step S13, the ECU 10 determines whether the roof glass 4 is located at the complete closure position. If it is determined that the roof glass 4 is at the complete closure position, the ECU 10 proceeds to step S7 and stops the motor 5.

If it is determined that the roof glass 4 is not located at the complete closure position at step S13, the ECU 10 returns to step S12.

At step S12, if it is determined that the pulse width Y of the input signal (pulse signal) sent from the rotational speed detecting device 16 is greater than the pulse width X2, which is the threshold value for the high speed range β, the ECU 10 determines that a foreign object is caught between the rim of the roof opening portion 3 and the roof glass 4 and proceeds to step S8. At step S8, the ECU 10 drives the motor 5 in the reverse direction to release the caught foreign object, and proceeds to step S9. At step S9, the ECU 10 determines whether the roof glass 4 is tilted up and located at the complete open position so that the caught foreign object can be released. If it is determined that the roof glass 4 is located at the complete open position, the ECU 10 proceeds to step S10 and stops the motor 5.

This embodiment provides the following advantages.

(1) During the tilt closing operation of the roof glass 4, the ECU 10 controls the switching relay 14 such that the torque of the motor 5 becomes relatively large when the traveling speed of the vehicle 1 is increased, that is, when the traveling speed of the vehicle 1 is in the high speed range β, as compared to the case where the traveling speed of the vehicle 1 is in the low speed range α. In general, as the traveling speed of the vehicle 1 increases, a pulling-up force due to a negative-pressure applied to the upper portion of the roof glass 4 and an upward force applied to the roof glass 4 by a swirl generated at the rear portion of the roof glass 4 are increased.

Therefore, the torque of the motor 5 is relatively increased when the traveling speed of the vehicle 1 is in the high speed range β as compared to the case where the traveling speed of the vehicle 1 is in the low speed range α so that the closure force of the roof glass 4 is increased to an optimal level. When the traveling speed of the vehicle is in the low speed range α, the torque of the motor 5 is decreased as compared to the case where the traveling speed of the vehicle 1 is in the high speed range β to suppress the catching force of the roof glass 4 to an optimal level.

(2) During the tilt closing operation of the roof glass 4, the traveling speed range is divided into the low speed range α and the high speed range β. Therefore, the torque of the motor 5 can be controlled in two stages. Therefore, the torque of the motor 5 can be easily controlled to optimize the closure force and the catching force. This further facilitates controlling the torque of the motor 5 compared with a case where the traveling speed range of the vehicle 1 is divided into more than two ranges.

(3) When the ECU 10 controls the switching relay 14 to switch the torque of the motor 5 in accordance with whether the traveling speed of the vehicle 1 is in the low speed range α or the high speed range β, the ECU 10 discretely changes the threshold value, which is set to determine whether there is a foreign object caught between the rim of the roof opening portion 3 and the roof glass 4, corresponding to the control of the switching relay 14. Since the ECU 10 changes not only the torque of the motor 5 but also the threshold value for determining the existence of the foreign object caught between the rim of the roof opening portion 3 and the roof glass 4, the catching force is stabilized regardless of whether the traveling speed of the vehicle 1 is in the low speed range α or the high speed range β.

(4) The changing device for switching the torque of the motor 5 is formed using the switching relay 14 and the resistor 15. Therefore, the structure of the torque switching means, or the control apparatus 7, is simplified. The torque of the motor 5 can be changed by a PWM control using a switching element such as a transistor. However, the preferred embodiment suppresses the electromagnetic noise more effectively as compared to such a structure.

The invention may be embodied in the following forms.

Figure 5:
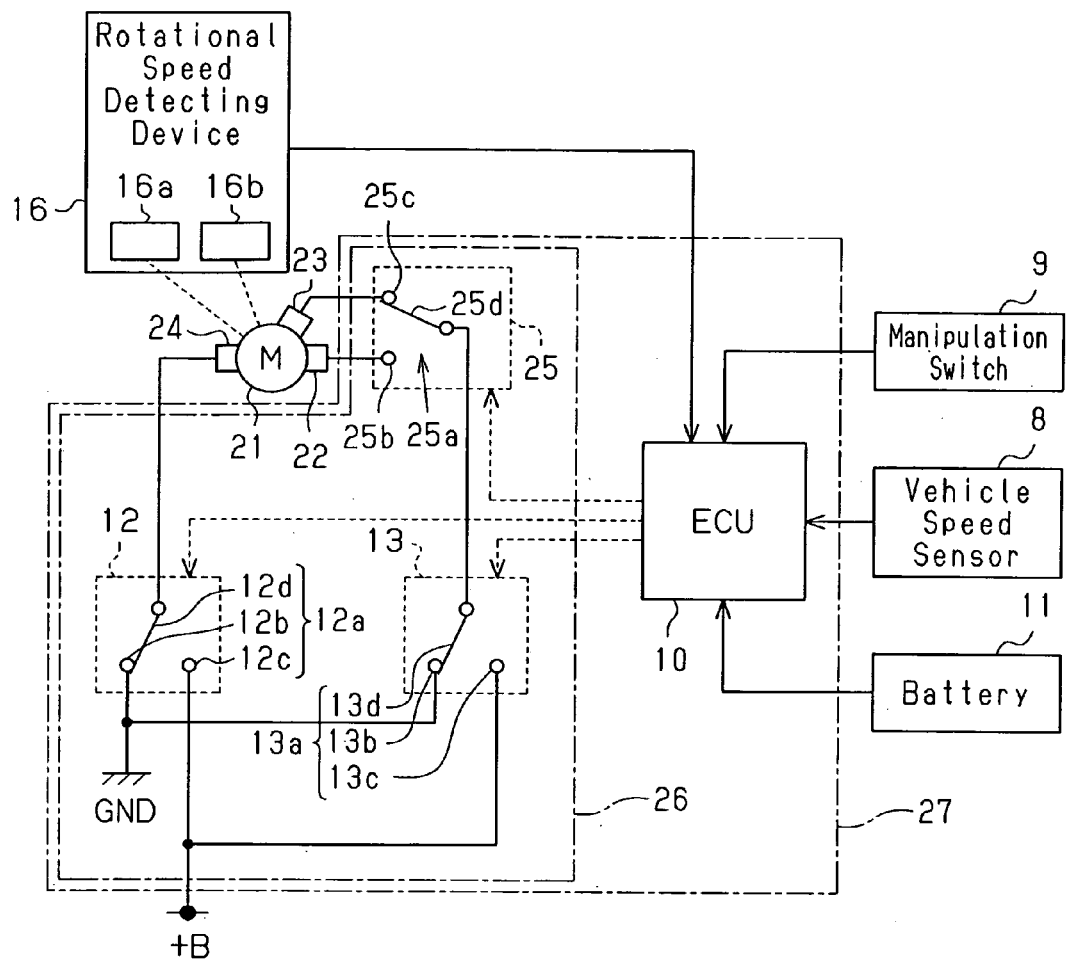
FIG. 5 is a block diagram illustrating a control apparatus of a roof glass according to a modified embodiment of the present invention.

In the above embodiment, the torque changing device for changing the torque of the motor 5 includes the switching relay 14 and the resistor 15. However, the present invention is not limited to this structure. For example, as shown in FIG. 5, the torque changing device may include a motor 21 with three brushes 22, 23, and 24. The motor 21 is equipped with a brush 22 for low speed drive and a brush 23 for high speed drive. The motor 21 also includes a common brush 24, which is connected to the movable terminal 12d of the drive relay 12. The brush 22 for low speed drive and the brush 23 for high speed drive are connected to a switch 25a of a brush switching relay 25.

The switch 25a includes two contacts 25b, 25c and a movable terminal 25d, which is switched between the contacts 25b, 25c by the control of the ECU 10. The brush 22 for low speed drive is connected to the contact 25b and the brush 23 for high speed drive is connected to the contact 25c. The brush switching relay 25 is connected to the movable terminal 13d of the drive relay 13. According to a control apparatus 27, which has a drive portion 26, if the ECU 10 determines that the traveling speed of the vehicle 1 is in the low speed range α during the tilt closing operation of the roof glass 4 (at this time, the movable terminal 12d is connected to the contact 12b and the movable terminal 13d is connected to the contact 13c), the movable terminal 25d is connected to the contact 25b and current is supplied through the brush 22 for low speed drive.

Figure 6:
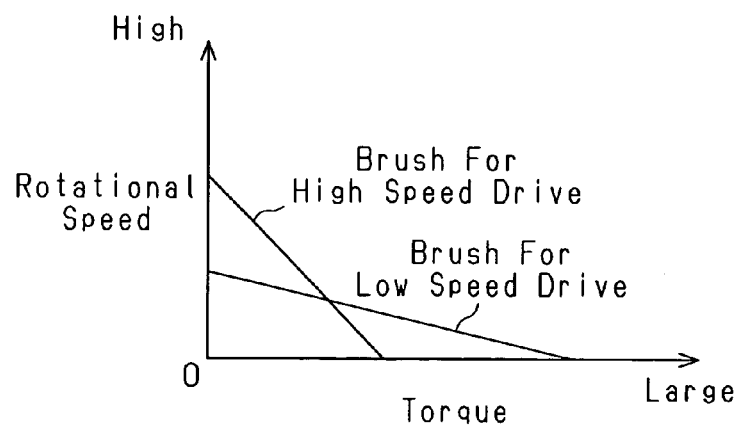
FIG. 6 is a characteristic diagram showing the relationship between the torque and the rotational speed of a drive motor incorporated in the apparatus of FIG. 5.

That is, as shown in the characteristic diagram of FIG. 6, the torque of the motor 21 is small. Contrarily, if the ECU 10 determines that the traveling speed of the vehicle 1 is in the high speed range β, the movable terminal 25d is connected to the contact 25c and current is supplied to the motor 21 through the brush 23 for high speed drive. That is, as shown in the characteristic diagram of FIG. 6, the torque of the motor 21 is large. With this structure also, the closure force and the catching force during the tilt closing operation of the roof glass 4 are optimized even if the traveling speed of the vehicle 1 is changed.

The ECU 10 may control the motor 21 to drive in the reverse direction by supplying current to the motor 21 from the brush 23 for high speed drive regardless of the traveling speed of the vehicle 1 if it is determined that a foreign object is caught between the rim of the roof opening portion 3 and the roof glass 4. In this case, the foreign object caught between the roof glass 4 and the roof panel 2 is quickly released.

In the above embodiment, the torque changing device for changing the torque of the motor 5 is formed by the switching relay 14 and the resistor 15. However, the torque of the motor 5 may be changed by a PWM control using a switching element such as a transistor. With this structure, the torque of the motor 5 can be controlled in accordance with the traveling speed of the vehicle 1 more carefully.

In the above embodiment, the low speed range α is less than 2 [km/h] and the high speed range β is greater than or equal to 2 [km/h]. However, the value may be set as required in accordance with the force acting on the vehicle 1 and the roof glass 4. Alternatively, the speed range may be divided into more than two ranges to discretely change the torque of the motor 5. In this case, the pulse width (rotational cycle of the motor 5) may be determined for each of the speed ranges as the threshold value for detecting whether a foreign object is caught between the rim of the roof opening portion 3 and the roof glass 4. At this time, the pulse width, which is the threshold value, is decreased as the traveling speed of the vehicle 1 is increased.

In the above embodiment, when it is determined that a foreign object is caught between the rim of the roof opening portion 3 and the roof glass 4, the ECU 10 tilts up the roof glass 4 to the complete open position. However, the present invention is not limited to this. When it is determined that a foreign object is caught between the rim of the roof opening portion 3 and the roof glass 4, the ECU 10 may open the roof glass 4 to a position that permits the foreign object to be released from between the rim of the roof opening portion 3 and the roof glass 4. In this case, the position where the foreign object can be released from between the rim of the roof opening portion 3 and the roof glass 4 may be determined in advance using a counter value.

In the above embodiment, the ECU 10 determines whether a foreign object is caught between the rim of the roof opening portion 3 and the roof glass 4 in the entire range of where the roof glass 4 moves during the tilt closing operation of the roof glass 4. However, the determination may be made in a predetermined range of the entire range where the roof glass 4 moves during the tilt closing operation. The range in which the determination is made may be set using the counter value in advance as a range defined by a counter value added by a predetermined counter value to a value where the roof glass 4 is located at the complete closure position of tilting down.

In the above embodiment, the opening and closing body is the roof glass 4. However, the opening and closing body may be formed of a material other than glass.

The present examples and embodiments are to be considered as illustrative and not restrictive and the invention is not to be limited to the details given herein, but may be modified within the scope and equivalence of the appended claims.

The invention claimed is:

1. An apparatus for controlling a motor, which drives an opening and closing body of a sunroof device, wherein the opening and closing body is driven by the motor such that the opening and closing body is tilted to selectively open and close an opening portion formed in a roof panel of a vehicle, the apparatus comprising:
    a drive portion, which supplies current to the motor to rotate the motor, the drive portion having a changing device for changing the torque of the motor; and
    a control portion, which controls the drive portion, the control portion controls the changing device such that the torque of the motor is increased as the traveling speed of the vehicle is increased during a closing operation of the opening and closing body.

2. The apparatus according to claim 1, wherein the traveling speed of the vehicle is divided into a plurality of speed ranges, the control portion controls the changing device such that the torque of the motor is discretely switched in accordance with the speed ranges.

3. The apparatus according to claim 2, wherein the traveling speed of the vehicle is divided into two speed ranges, which are a low speed range and a high speed range.

4. The apparatus according to claim 1, wherein the changing device discretely changes the torque of the motor.

5. The apparatus according to claim 4, wherein the changing device includes a switching circuit, which switches between a current path that includes a resistor and a current path that does not include the resistor.

6. The apparatus according to claim 1, wherein the control portion determines whether a foreign object is caught between the rim of the opening portion and the opening and closing body based on the comparison between a value showing the driving state of the motor and a predetermined threshold value, and when it is determined that a foreign object is caught between the rim of the opening portion and the opening and closing body, the control portion controls the motor to release the foreign object,
    wherein the control portion changes the threshold value in accordance with the control state of the changing device.

7. The apparatus according to claim 6, wherein the control portion changes the threshold value such that a catching force of the opening and closing body becomes constant.

8. A sunroof device applied to a vehicle equipped with a roof panel having an opening portion, the sunroof device comprising:
    an opening and closing body, which tilts to selectively open and close the opening portion;
    a motor, which drives the opening and closing body;
    a drive portion, which supplies current to the motor to rotate the motor, the drive portion having a changing device for switching the torque of the motor; and
    a control portion, which controls the drive portion, the control portion controls the changing device such that the torque of the motor is increased as the traveling speed of the vehicle is increased during a closing operation of the opening and closing body.

9. The device according to claim 8, wherein the traveling speed of the vehicle is divided into a plurality of speed ranges, the control portion controls the changing device such that the torque of the motor is discretely switched in accordance with the speed ranges.

10. The device according to claim 9, wherein the traveling speed of the vehicle is divided into two speed ranges, which are a low speed range and a high speed range.

11. The device according to claim 8, wherein the changing device discretely changes the torque of the motor.

12. The device according to claim 11, wherein the changing device includes a switching circuit, which switches between a current path that includes a resistor and a current path that does not include the resistor.

13. The device according to claim 8, wherein the control portion determines whether a foreign object is caught between the rim of the opening portion and the opening and closing body based on the comparison between a value showing the driving state of the motor and a predetermined threshold value, and when it is determined that a foreign object is caught between the rim of the opening portion and the opening and closing body, the control portion controls the motor to release the foreign object, wherein the control portion changes the threshold value in accordance with the control state of the changing device.

14. The device according to claim 13, wherein the control portion changes the threshold value such that a catching force of the opening and closing body becomes constant.

15. A sunroof device incorporated in a vehicle equipped with a roof panel having an opening portion, the sunroof device comprising:

an opening and closing body, which selectively opens and closes the opening portion;

a motor, which drives the opening and closing body; and a control apparatus for controlling the motor, the control apparatus increases the torque of the motor as the traveling speed of the vehicle increases during closing operation of the opening and closing body.

16. A method for controlling a motor, which drives an opening and closing body of a sunroof device, wherein the opening and closing body is provided with a roof panel of a vehicle, the method comprising:

driving the opening and closing body by the motor such that the opening and closing body is tilted to selectively open and close an opening portion formed in the roof panel of the vehicle; and controlling the motor such that the torque of the motor is increased as the traveling speed of the vehicle is increased during closing operation of the opening and closing body.

* * * * *